United States Patent [19]

Tecza et al.

[11] Patent Number: 5,521,448
[45] Date of Patent: May 28, 1996

[54] DAMPING FOR PASSIVE MAGNETIC BEARINGS

[75] Inventors: Joseph A. Tecza, Schenectady; Dantam K. Rao, Niskayuna, both of N.Y.

[73] Assignee: Mechanical Technology Incorporated, Latham, N.Y.

[21] Appl. No.: 283,564

[22] Filed: Aug. 1, 1994

[51] Int. Cl.$^6$ .............................. H02K 2/09; H02K 5/24
[52] U.S. Cl. ............................................. 310/90.5; 310/51
[58] Field of Search ........................................ 310/51, 90.5

[56] References Cited

U.S. PATENT DOCUMENTS

| | | | |
|---|---|---|---|
| 2,704,231 | 3/1955 | Goldsmith | 310/90.5 |
| 3,885,839 | 5/1975 | Habermann | 310/90.5 |
| 4,223,240 | 9/1980 | Theyse | 310/90.5 |
| 4,236,426 | 12/1980 | Meinke et al. | 310/51 |
| 4,334,718 | 6/1982 | Hirt et al. | 310/90.5 |
| 4,511,190 | 4/1985 | Caye et al. | 310/51 |
| 4,710,656 | 12/1987 | Studer | 310/51 |
| 4,760,299 | 7/1988 | Dickie et al. | 310/51 |
| 4,988,906 | 1/1991 | Littlefield | 310/90.5 |
| 5,059,845 | 10/1991 | Wilson | 310/90.5 |
| 5,101,398 | 3/1992 | Inoue et al. | 310/90.5 |
| 5,117,448 | 5/1992 | Penato et al. | 310/90.5 |
| 5,126,610 | 6/1992 | Fremerey | 310/90.5 |
| 5,142,177 | 8/1992 | Higuchi et al. | 310/90.5 |
| 5,394,044 | 2/1995 | Yamamura | 310/90.5 |

FOREIGN PATENT DOCUMENTS

| | | | |
|---|---|---|---|
| 2489449 | 3/1982 | France | 310/90.5 |
| 56-59027 | 5/1981 | Japan | 310/90.5 |
| 57-186618 | 11/1982 | Japan | 310/90.5 |
| 57-186619 | 11/1982 | Japan | 310/90.5 |
| 58-37317 | 3/1983 | Japan | 310/90.5 |

OTHER PUBLICATIONS

IEEE Transactions on Magnetics, vol. MAG–14, No. 3(?) 1978; *Passive Magnetic Bearings with Permanent Magnets:* Jean–Paul Yonnet.

IEEE Transactions on Magnetics, vol. 30, No. 5, Sep. 1994; *A New Improved Method for Computation of Radial Stiffness of Permanent Magnet Bearings;* Marlene Marinescu and Nicolae Marinescu.

Primary Examiner—Clayton E. LaBalle
Attorney, Agent, or Firm—Kane, Dalsimer, Sullivan, Kurucz, Levy, Eisele and Richard

[57] ABSTRACT

The apparatus includes a resilient mounting for the damping of magnetic bearings. This mount may include a resilient material placed between the magnetic stator and the fixed structure to damp vibrations of the stator induced by variations in the position of the shaft and rotor of the bearing. Alternatively, the resilient material may be placed between successive concentric magnetic rings of the stator. The resilient material is typically an elastomer or a woven metal material with both stiffness and damping properties. The mounting also may consist of separate spring and damping elements. The spring elements can include thin rods or bars which provide both alignment and stiffness. The damping element may consist of a resilient material or a device to provide damping through viscous or mechanical friction configurations.

9 Claims, 2 Drawing Sheets

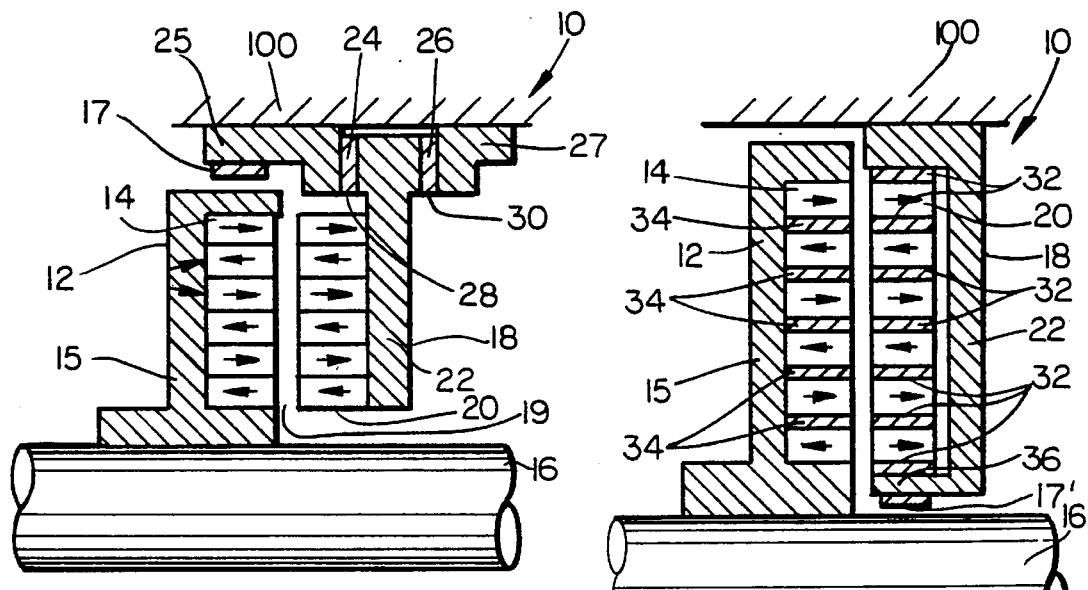
FIG. 1
FIG. 2
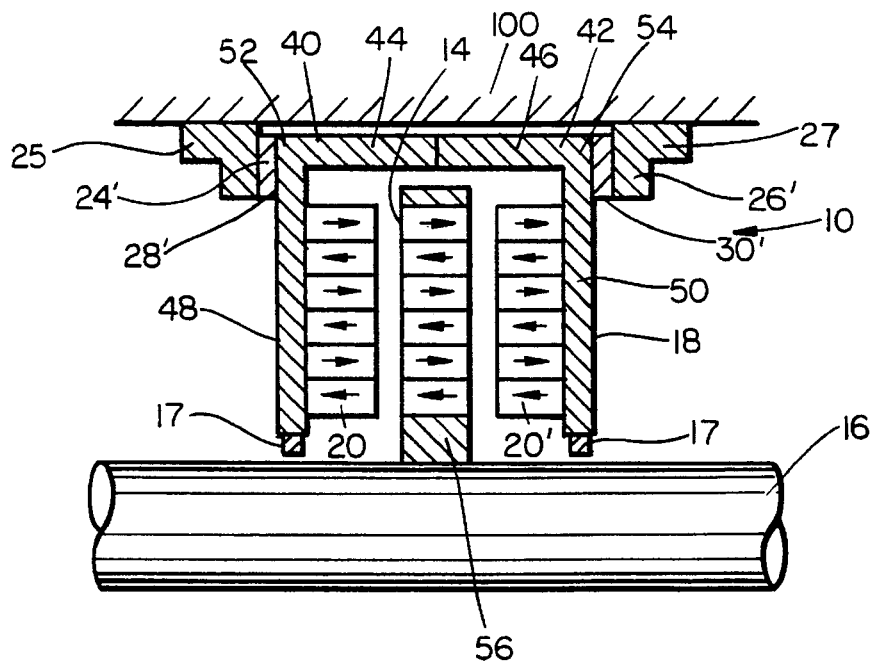
FIG. 3

DAMPING FOR PASSIVE MAGNETIC BEARINGS

BACKGROUND OF THE INVENTION

1. Field of the Invention

The invention pertains to additional damping for a passive magnetic bearing by mounting the magnetic elements and/or assembly on a resilient material, such as an elastomer or woven metal pad, having both stiffness and damping properties.

2. Description of the Prior Art

Passive magnetic bearings for rotating machines generally possess very small amounts of vibrational damping. Therefore, in the machinery systems which include rotors, support on these bearings can be expected likewise to show very light damping. This condition is manifested by very large vibratory amplitudes as rotors traverse their critical speeds, great sensitivity to unbalanced conditions and poor resistance to instability. One method for increasing the damping in a passive magnetic bearing is to introduce a non-magnetic, electrically conducting material into the rotor/stator gap, creating increased hysteresis losses. However, losses due to hysteresis are insufficient to generate the degree of damping required in many rotating machinery applications.

OBJECTS AND SUMMARY OF THE INVENTION

It is therefore an object of this invention to provide a damper for magnetic bearings with significant amounts of damping.

It is therefore a further object of this invention to provide a damper for magnetic bearings in which stiffness and damping can be tuned to optimize system dynamic characteristics.

It is therefore a still further object of this invention to provide a damper for magnetic bearings in which a wide range of operating temperatures can be achieved by variation in the choice of damping material.

It is therefore a still further object of this invention to provide a damper for magnetic bearings which will provide damping as the rotor of the magnetic bearing traverses critical speeds.

It is therefore a still further object of this invention to provide a damper for magnetic bearings which provides more damping than can be provided by hysteresis losses.

It is therefore a final object of this invention to provide a damper for magnetic bearings which is simple, compact, light in weight and low in cost.

These and other objects are achieved by providing resilient materials in the construction of the bearing stator. The materials possess inherent stiffness and damping and can be, for example, an elastomeric material, other low modulus polymers, layers of elastomeric materials separated by thin, rigid sheets, or they can be woven, knitted or felted metal or other fibers. For the latter case, the fibers can be dry or infused with a dry lubricant, a liquid such as oil or a grease-type material to improve damping and service life.

The apparatus of the invention includes resilient material in a passive magnetic bearing, forming an integrated bearing-damper cartridge. A first aspect of the invention includes a passive magnetic bearing where the magnets are arranged radially in concentric rings. The rotating portion of the bearing is fixed rigidly to the shaft while the non-rotating stack is mounted to a fixed structure through a resilient material so that vibratory loads are carried in shear. Two sheets may be used, one on each side of the stationary bearing mount, so that the resilient material can be preloaded axially. This configuration of material can be a solid sheet or can be a collection of individual segments or pads. The shear stiffness of the resilient material is adjusted so that it is low enough to permit the mount material to be strained enough to absorb a significant amount of energy and thereby produce system damping.

A second aspect of the invention includes layers of mount material between the magnetic rings. In the second aspect of the invention, motion in the resilient material is compressive, rather than shearing, in nature.

A third aspect of the invention includes a cartridge type configuration formed from two opposed L-shaped elements. The resilient material is placed outwardly adjacent from the respective corners of the L-shaped elements.

A fourth aspect of the invention includes a configuration in which a separate mechanical mounting spring and damping element are mounted in parallel. The spring element provides radial stiffness and axial location of the stationary magnetic ring, and the damping elements provides both radial stiffness and damping to the assembly.

In the first, second, third or fourth aspects, an optional bumper or backup bearing may be used to limit radial excursions of the shaft under overload conditions.

BRIEF DESCRIPTION OF THE DRAWINGS

Further objects and advantages of the invention will become apparent from the following description and claims, and from the accompanying drawings, wherein:

FIG. 1 is a cross-sectional view of the first aspect of the invention, including a resiliently mounted stationary magnet stack.

FIG. 2 is a cross-sectional view of the second aspect of the invention, including resilient material between stationary magnets.

FIG. 3 is a cross-sectional view of a third aspect of the invention, which is an alternative configuration of the first aspect of the invention illustrated in FIG. 1.

DETAILED DESCRIPTION OF THE PREFERRED EMBODIMENT

Figure 4:
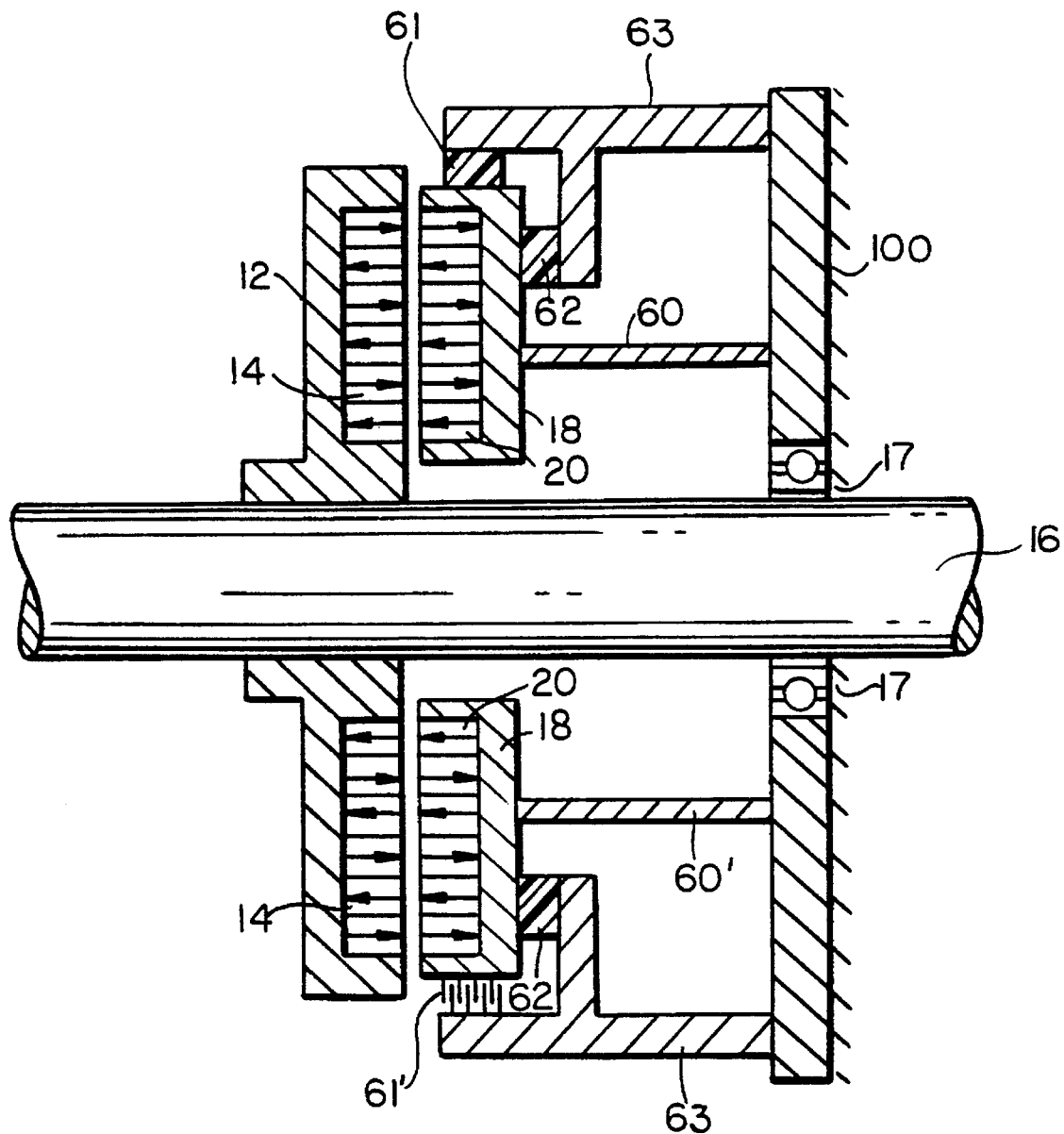
FIG. 4 is a cross-sectional view of a fourth aspect of the invention, including a resiliently mounted stationary magnet stack incorporating separate spring and damping elements.

Referring now to the drawings in detail wherein like numerals indicate like elements throughout the several views, one sees that FIG. 1 is a cross-sectional view of a passive magnetic bearing 10, including a resiliently mounted magnetic stack. This configuration of the rotor and stator of bearing 10 itself is disclosed, including radially arranged concentric magnetic rings, in detail in application Ser. No. 08/283,771, filed Aug. 1, 1994, entitled "Passive Magnetic Bearing Configuration", the disclosure of which is incorporated herein by reference.

The rotating portion or rotor 12 of the bearing 10 includes a stack 14 of concentric magnetic rings of alternating polarity which is fixed to rotating bearing element retainer 15 (preferably of, or backed with, a magnetic material such as iron or steel to form a tight magnetic circuit) which is fixed rigidly to and extends perpendicularly from the shaft 16 and rotates therewith. Stator 18 includes a non-rotating (or stationary) stack 20 of concentric magnetic rings of alternating polarity (with respective aligned rings of stacks 14 and 20 across magnetic air gap 19 being of the same polarity as described in the above-identified application) and is mounted to bearing mount structure or backing 22 (preferably of or backed with a magnetic material such as iron, steel or a similar material to form a tight magnetic circuit). Bearing mount structure 22 extends perpendicularly from fixed structure 100, perpendicularly to shaft 16 and parallel to rotor 12. Gaps 24 and 26 are formed between bearing mount structure 22 and outer stator abutments 25, 27 which are attached to fixed structure 100. Gaps 24 and 26 are further formed on the sides of bearing mount structure 22 which face toward rotor 12 and which face away from rotor 12, respectively. Gaps 24 and 26 include a resilient material 28, 30, respectively, such as an elastomer or woven metal pad having both stiffness and damping properties so that vibratory loads are carried in shear. Two sheets of resilient material 28, 30 are used in the configuration shown so that the resilient material 28, 30 can be preloaded axially. The resilient material 28, 30 can be a solid sheet or can be a collection of individual segments or pads. The shear stiffness of the resilient material 28, 30 is adjusted so that it is low enough to permit the bearing mount structure 22 to be strained enough to absorb a significant amount of energy and thus produce system damping. For example, the stiffness of bearing mount structure 22 would generally be on the same order as the radial bearing stiffness.

Outer stator abutment 25 provides a place for an optional bumper 17 which resiliently urges against rotating bearing element retainer 15 when rotor 12 and shaft 16 are substantially radially displaced thereby limiting radial excursions of rotor 12.

In operation, radial vibration of the rotor 12 causes the rotating stack 14 of concentric magnetic rings to generate a radial magnetic force on the stationary mount structure 22. This force causes the stationary mount structure 22 to be urged against the resilient material 28, 30 thereby straining the resilient material 28, 30 and producing damping.

Referring now to FIG. 2, one sees that FIG. 2 illustrates a configuration similar to FIG. 1 except that bearing mount structure 22 is rigidly fastened to fixed structure 100, and pads 32 of resilient material are placed between the successive magnetic rings of stack 20 on stator 18. In order to maintain the alignment of respective magnetic rings of stacks 14 and 20, inert rigid spacers 34 are placed between successive magnetic rings of stack 14 on rotor 12. Additionally, stationary mount structure 22 includes a portion 36 radially inward of stack 20 of successive magnetic rings and parallel to shaft 16. Portion 36 provides a location for optional bumper 17', which similar to bumper 17, limits the radial excursions of shaft 16.

In the aspect illustrated in FIG. 2, motion in the resilient pads 32 is compressive in nature, rather than shearing. In the aspects illustrated in both FIGS. 1 and 2, a shaped metal foil such as a "bump foil" used in gas bearings may be substituted for the resilient material for the purpose of providing both stiffness and damping.

FIG. 3 illustrates a third aspect of the invention wherein the stator 18 includes a cartridge configuration which is formed by two symmetrically opposed L-shaped bearing mount structures 40, 42 with upper legs 44, 46 and lower legs 48, 50, respectively. Upper legs 44, 46 are congruent with each and are parallel to shaft 16. Lower legs 48, 50 are formed at the outer ends of upper legs 44, 46 and extend toward shaft 16, and are perpendicular thereto. The edges of legs 48, 50 which face shaft 16 optionally include bumpers 17 to limit the radial excursions of shaft 16. The inwardly facing sides of lower legs 48, 50 support stacks 20, 20', respectively, of concentric magnetic rings of alternating polarity. As stated in the above-identified related application, the polarity of the concentric magnetic rings on stack 20 is aligned with the polarity of corresponding concentric magnetic rings on stack 20'. Outwardly adjacent from corners 52, 54 of L-shaped bearing mount structures 40, 42 are gaps 24', 26', respectively, which engage resilient material 28', 30' between corners 52, 54 and fixed structure 100. Damping is provided thereby which is similar to that described with regard to the aspect of the invention illustrated in FIG. 1.

Rotor 12 is fixed to shaft 16 and rotates therewith. Rotor 12 is comprised of rotating stack 14 of concentric magnetic rings of alternating polarity mounted on radial spacer 56 which is concentrically outward from shaft 16. In its nominal position, rotating stack 14 is parallel with and equidistant between stationary stacks 20, 20'. The respective rings of stack 14 have polarities which are aligned and in the same direction as corresponding aligned magnetic rings from stacks 20, 20'.

FIG. 4 illustrates a fourth aspect of the invention, wherein the stator 18 of a construction similar to that shown in FIG. 1 is flexibly supported by spring elements 60 and damping elements 61, 62 (with damping element 61' being a variation of damping element 61, and including dry frictional elements to provide the damping). The spring elements are fastened rigidly to fixed structure 100 and damping elements are supported by mount 63, which is in turn fastened to support structure 100. The flexible spring elements 60 serve to align the stator 18 both axially (resisting the attractive pull of magnets 20) and radially, and provide the stator with a radial centering stiffness. One embodiment of spring elements 60 includes thin metal bars or rods, affixed rigidly at the ends to stator 18 and fixed structure 100. A series of these bars or "flexures" arranged at a fixed radius from the shaft centerline provide the required degree of axial and radial alignment to the stator, a fixed degree of radial stiffness and constrains motion of the stator to a plane perpendicular to the center line of shaft 16. Other embodiments of spring elements 60 are possible. In addition, the mount 63 supports a bumper 17, which in this embodiment is shown as a rolling element bearing.

Damping elements 61 and 62 are composed of resilient materials similar to the resilient material 28, 30 described in FIG. 1. Their purpose is to act to provide damping to the bearing assembly. Damping element 61 is shown such that it acts in compression and/or tension, while damping element 62 is shown acting in shear. Either one or both types may be included in the suspension. In addition, this configuration allows other types of damping elements, such as viscous or friction-type dampers (such as damping element 61' shown in FIG. 4), to be used. The stiffness of the elements supporting stator 18 is the combined stiffness of elements 60, 61 and 62. Typically, the combined stiffness would be on the same order as the radial bearing stiffness, which would allow damping elements 61 and/or 62 to be strained enough to absorb a significant amount of energy and thereby produce system damping.

To use magnetic bearings 10 of any of the four illustrated aspects, the resilient material is preloaded and the magnetic bearings are configured in a normal way. Variations in the positions of the rotor and shaft translate into forces on the stator. These forces on the stator are damped by the presence of the resilient material. Large excursions of the rotor and stator are compensated for by the optional bumpers.

Thus the several aforementioned objects and advantages are most effectively attained. Although preferred embodiments of the invention has been disclosed and described in detail herein, it should be understood that this invention is in no sense limited thereby and its scope is to be determined by that of the appended claims.

What is claimed is:

1. In a magnetic bearing including a rotor and stator, both said rotor and stator including magnetic elements, the improvement comprising first and second elements for mounting the stator, said first element comprising a series of thin rods or bars anchored at a first end to said bearing stator and at a second end to a fixed mount and providing stiffness and alignment, said second element providing damping, and wherein said first and second elements are arranged to act in parallel.

2. The improvement of claim 1 wherein said second element is comprised of a viscoelastic material.

3. The improvement of claim 1 wherein said second element is comprised of a woven metal material.

4. The improvement of claim 1 wherein said second element is comprised of a mechanical damping deriving its damping from a viscous material.

5. The improvement of claim 4 wherein said viscous material is grease.

6. The improvement of claim 4 wherein said viscous material is oil.

7. The improvement of claim 1 wherein said second element is comprised of a mechanical damper deriving its damping from dry friction motion between components thereof.

8. In a magnetic bearing including a rotor and stator, both said rotor and stator including magnetic elements, the improvement comprising an element for mounting said stator wherein said element comprises a series of thin rods or bars anchored at a first end to the bearing stator and at a second end to a fixed mount.

9. The improvement of claim 8 wherein said mounting element comprises one or more curved beams arranged around the stator and concentric with it, each beam being affixed at one or more points along its length to the stator and additionally at one or more points along its length to a fixed mount.

* * * * *